United States Patent
Zhao et al.

(10) Patent No.: US 10,048,687 B2
(45) Date of Patent: Aug. 14, 2018

(54) SYSTEM AND METHOD FOR MOBILE PLATFORM OPERATION

(71) Applicant: SZ DJI TECHNOLOGY CO., LTD., Shenzhen, Guangdong (CN)

(72) Inventors: Cong Zhao, Shenzhen (CN); Ketan Tang, Shenzhen (CN); Guyue Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/178,268

(22) Filed: Jun. 9, 2016

(65) Prior Publication Data
US 2016/0291594 A1   Oct. 6, 2016

Related U.S. Application Data

(63) Continuation of application No. PCT/CN2015/075437, filed on Mar. 31, 2015.

(51) Int. Cl.
| | | |
|---|---|---|
| *G01D 1/00* | (2006.01) | |
| *G01S 15/93* | (2006.01) | |
| *G01S 17/93* | (2006.01) | |
| *G05D 1/00* | (2006.01) | |
| *G05D 1/10* | (2006.01) | |
| *G01S 17/36* | (2006.01) | |
| *G01S 17/58* | (2006.01) | |

(Continued)

(52) U.S. Cl.
CPC .......... *G05D 1/0088* (2013.01); *G01S 7/4808* (2013.01); *G01S 7/497* (2013.01);
(Continued)

(58) Field of Classification Search
CPC .... G05D 1/0088; G05D 1/102; G05D 1/0094; G01S 7/497; G01S 15/025; G01S 17/89;
(Continued)

(56) References Cited

U.S. PATENT DOCUMENTS

| | | | |
|---|---|---|---|
| 6,055,042 A | 4/2000 | Sarangapani | |
| 6,323,942 B1 | 11/2001 | Bamji | |

(Continued)

FOREIGN PATENT DOCUMENTS

| | | |
|---|---|---|
| CN | 102175882 A | 9/2011 |
| CN | 202400085 U | 8/2012 |

(Continued)

OTHER PUBLICATIONS

WO, International Search Report and Written Opinion, PCT/CN2015/075437, dated Dec. 24, 2015.

*Primary Examiner* — Redhwan K Mawari
*Assistant Examiner* — Rodney P King
(74) *Attorney, Agent, or Firm* — Anova Law Group, PLLC

(57) ABSTRACT

A system for operating a mobile platform using distance and speed information and methods for making and using same. The system includes a time-of-flight sensor and an ultrasound sensor for measuring a distance between the mobile platform and an obstacle and a processor for integrating the sensed measurements and controlling the mobile platform. The distance measured by the time-of-flight sensor can be determined via a phase shift method. The time-of-flight sensor can also be used to measure a speed of the mobile platform by imaging a reference point at different times and using stereopsis to ascertain the displacement. Distances and speeds measured using the time-of-flight and ultrasound sensors can be integrated to improve measurement accuracy. The systems and methods are suitable for use in controlling any type of mobile platform, including unmanned aerial vehicles and advantageously can be applied for avoiding collisions between the mobile platform and the obstacle.

30 Claims, 14 Drawing Sheets

(51) Int. Cl.
*G01S 17/89* (2006.01)
*G01S 15/02* (2006.01)
*G01S 7/48* (2006.01)
*G01S 7/497* (2006.01)

(52) U.S. Cl.
CPC ............ *G01S 15/025* (2013.01); *G01S 17/36* (2013.01); *G01S 17/58* (2013.01); *G01S 17/89* (2013.01); *G01S 17/933* (2013.01); *G05D 1/0094* (2013.01); *G05D 1/102* (2013.01); *G01S 15/93* (2013.01)

(58) Field of Classification Search
CPC ........ G01S 17/58; G01S 7/4808; G01S 17/36; G01S 17/933; G01S 15/93
See application file for complete search history.

(56) References Cited

U.S. PATENT DOCUMENTS

| | | | |
|---|---|---|---|
| 2005/0074162 A1* | 4/2005 | Tu | G06T 7/0018 382/154 |
| 2005/0273218 A1* | 12/2005 | Breed | B60C 11/24 701/2 |
| 2010/0063651 A1* | 3/2010 | Anderson | G05D 1/0088 701/2 |
| 2011/0163908 A1* | 7/2011 | Andersson | G01S 5/0072 342/36 |
| 2011/0184605 A1* | 7/2011 | Neff | G05D 1/0255 701/25 |
| 2012/0194644 A1* | 8/2012 | Newcombe | G06T 7/20 348/46 |
| 2014/0195095 A1 | 7/2014 | Flohr et al. | |

FOREIGN PATENT DOCUMENTS

| | | |
|---|---|---|
| CN | 102749927 A | 10/2012 |
| CN | 103592947 A | 2/2014 |
| CN | 103744430 A | 4/2014 |
| EP | 2169499 A2 | 3/2010 |
| JP | H1183530 A | 3/1999 |
| JP | 2014194729 A | 10/2014 |
| WO | 2013130734 A1 | 9/2013 |

* cited by examiner

SYSTEM AND METHOD FOR MOBILE PLATFORM OPERATION

CROSS-REFERENCE TO RELATED APPLICATIONS

This application is a continuation of, and claims priority to, copending PCT Patent Application Number PCT/CN2015/075437, which was filed on Mar. 31, 2015. The disclosure of the PCT application is herein incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to mobile platform operations and more particularly, but not exclusively, to systems and methods using distance and speed detection for operating a mobile platform.

BACKGROUND

Autonomous or self-guided obstacle avoidance is an important feature of mobile platforms. Techniques for enabling a mobile platform to detect potential obstacles in its spatial environment include, for example, ultrasound, time-of-flight, and other methods. Individual methods, however, each have certain drawbacks that render them non-ideal for self-guided obstacle avoidance. For example, ultrasound-based obstacle detection has limited detection range (commonly less than five meters) as well as limited sensitivity to small objects. Hence, ultrasound-based devices are insufficient for use in obstacle avoidance of fast-moving objects (for example, objects moving faster than 10 meters per second), since the limited detection range gives insufficient warning for the mobile platform or vehicle to decelerate and avoid the obstacle.

Time-of-flight (ToF) sensing, an alternative technique, can acquire obstacle distances based on a travel time of emitted light to and from the obstacle. Advantages of time-of-flight sensing include long detection range and high resolution. But time-of-flight sensing has certain drawbacks for mobile platform obstacle detection. For example, strong ambient light may result in a low signal-to-noise ratio for time-of-flight sensors. Furthermore, a time-of-flight signal can vary based on reflective properties of the object imaged, particularly for mirror-like objects such as glass or water surfaces.

In view of the foregoing, there is a need for systems and methods for mobile platform operation for obstacle avoidance that overcome disadvantages of individual distance detection methods.

Figure 1:
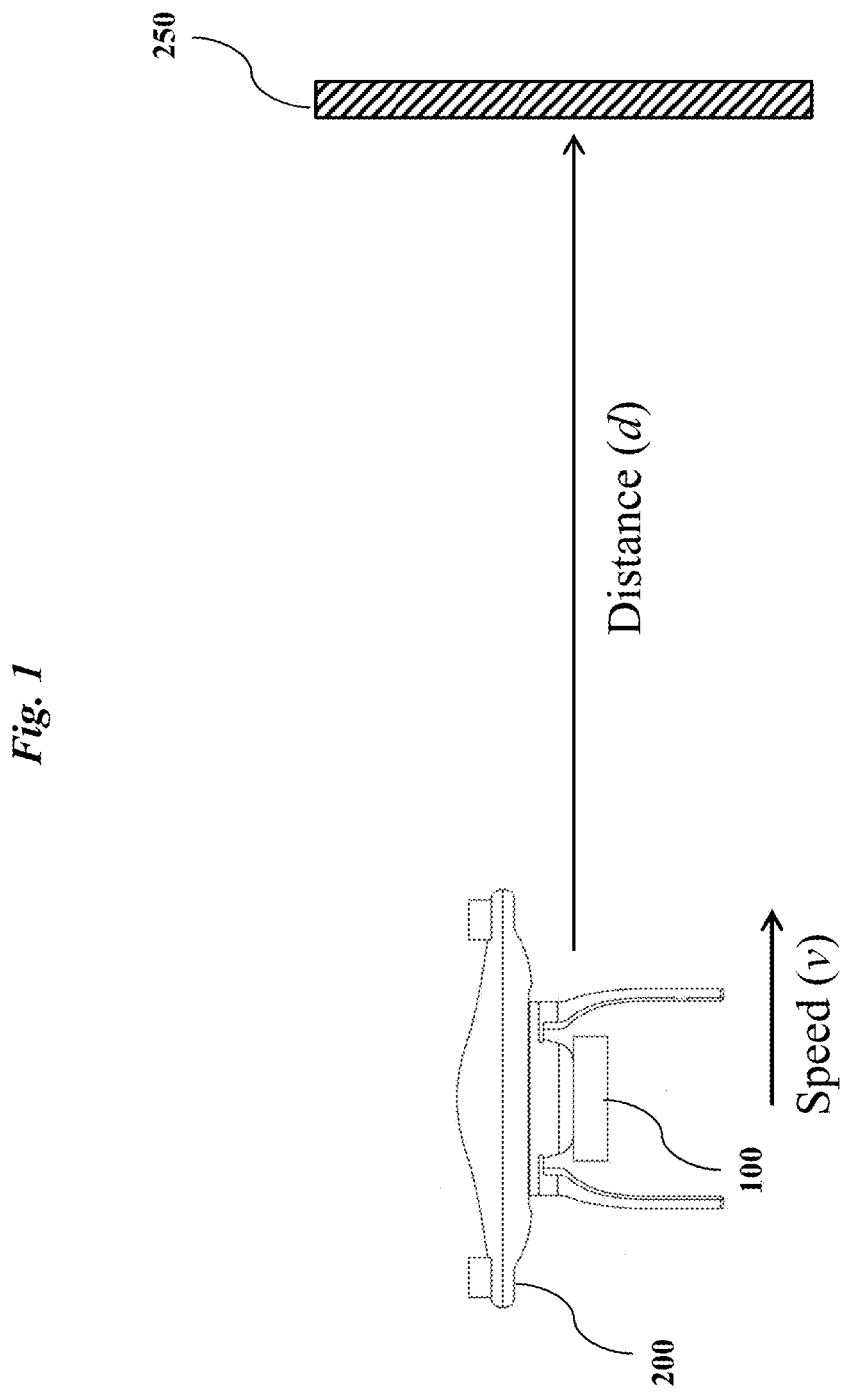
FIG. 1 is an exemplary diagram illustrating an embodiment of a mobile platform control system mounted aboard a mobile platform shown in relation to an obstacle.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

The present disclosure sets forth systems and methods for using time-of-flight and/or ultrasound sensing for mobile platform obstacle detection and avoidance, overcoming disadvantages of prior systems and methods.

Turning now to FIG. 1, a mobile platform control system 100 is shown as being mounted aboard a mobile platform 200. The mobile platform 200 is shown in relation to an obstacle 250. The mobile platform 200 is situated a distance d from the obstacle 250 and is moving at a speed v relative to the obstacle 250. The mobile platform control system 100 is configured to determine the distance d and, based on the speed v, control the movement of the mobile platform 200 to avoid collision with the obstacle 250.

Exemplary mobile platforms 200 include, but are not limited to, bicycles, automobiles, trucks, ships, boats, trains, helicopters, aircraft, various hybrids thereof, and the like. In some embodiments, the mobile platform 200 is an unmanned aerial vehicle (UAV), Colloquially referred to as "drones". UAVs are aircraft without a human pilot onboard the vehicle whose flight is controlled autonomously or by a remote pilot (or sometimes both). UAVs are now finding increased usage in civilian applications involving various aerial operations, such as data-gathering or delivery. The present control systems and methods are suitable for many types of UAVs including, without limitation, quadcopters (also referred to a quadrotor helicopters or quad rotors), single rotor, dual rotor, trirotor, hexarotor, and octorotor rotorcraft UAVs, fixed wing UAVs, and hybrid rotorcraft-fixed wing UAVs.

Figure 2:
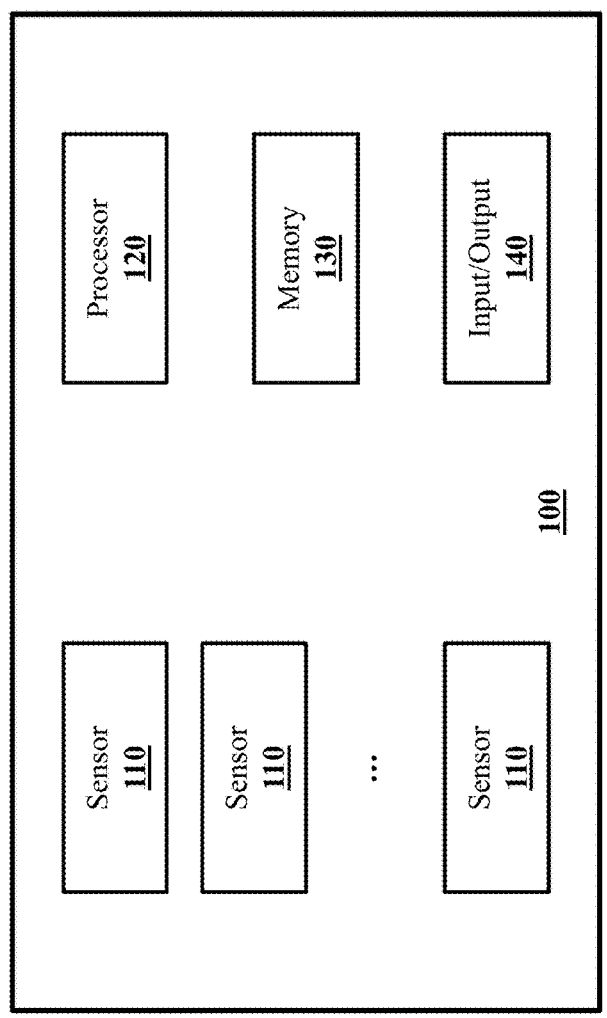
FIG. 2 is an exemplary top-level block diagram illustrating an embodiment of the mobile platform control system of FIG. 1.

Turning now to FIG. 2, an exemplary mobile platform control system 100 is shown as including a plurality of sensors 110. The mobile platform control system 100 can include any number of sensors 110, as desired—for example, 1, 2, 3, 4, 5, 6, or even a greater number of sensors 110. The sensors 110 can be arranged in any desired manner on the mobile platform control system 100, with the specific arrangement of sensors 110 depending on the imaging application. The sensors 110 can advantageously be lightweight and capable of high-frequency data collection so as to facilitate real-time obstacle detection and avoidance. Exemplary sensors 110 suitable for use in the mobile platform control system 100 include, but are not limited to, color or monochrome sensors, electro-optical sensors, thermal/infrared sensors, time-of-flight sensors, ultrasound sensors, multi-spectral imaging sensors, spectrophotometers, spectrometers, thermometers, illuminometers, microphones/sonic transducers, and others.

As shown in FIG. 2, the sensors 110 can interface with one or more processors 120. Without limitation, each processor 120 can include one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like. The processors 120 can be configured to perform any of the methods described herein, including but not limited to, a variety of operations relating to obstacle detection and avoidance. In some embodiments, the processors 120 can include specialized hardware for processing specific operations relating to obstacle detection and avoidance—for example, processing time-of-flight data, processing ultrasound data, determining an obstacle distance based on collected data, and controlling a mobile platform (not shown) based on the determined distance.

In some embodiments, the processor 120 is located in physical proximity to the sensors 110. In such cases, the processor 120 and the sensors 110 can be configured to communicate locally, for example, using hardware connectors and buses. An advantage of local communication is that transmission delay can be reduced to facilitate real-time obstacle detection and avoidance.

In other embodiments, obstacle data can be sent to a remote terminal (not shown) for processing, advantageously facilitating user feedback and integration with other data (for example, positions of other mobile platforms, weather conditions, global positioning system (GPS) signals, and the like). In such cases, the processors 120 can be located remotely from the sensors 110. In one embodiment, a distance d and speed v of a mobile platform 200 can be transmitted to the remote terminal for processing. After processing, the remote terminal can generate a control signal based on the distance d and speed v and send the control signal back to the mobile platform 200. Various wireless communication methods can be used for remote communication between the sensors 110 and the processors 120. Suitable communication methods include, for example, radio, Wireless Fidelity (Wi-Fi), cellular, satellite, and broadcasting.

As shown in FIG. 2, the mobile platform control system 100 can include one or more additional hardware components (not shown), as desired. Exemplary additional hardware components include, but are not limited to, a memory 130 (for example, a random access memory (RAM), static RAM, dynamic RAM, read-only memory (ROM), programmable ROM, erasable programmable ROM, electrically erasable programmable ROM, flash memory, secure digital (SD) card, etc.), and/or one or more input/output interfaces (for example, universal serial bus (USB), digital visual interface (DVI), display port, serial ATA (SATA), IEEE 1394 interface (also known as FireWire), serial, video graphics array (VGA), super video graphics array (SVGA), small computer system interface (SCSI), high-definition multimedia interface (HDMI), audio ports, and/or proprietary input/output interfaces). One or more input/output devices 140 (for example, buttons, a keyboard, keypad, trackball, displays, and a monitor) can also be included in the mobile platform control system 100, as desired.

Figure 3:
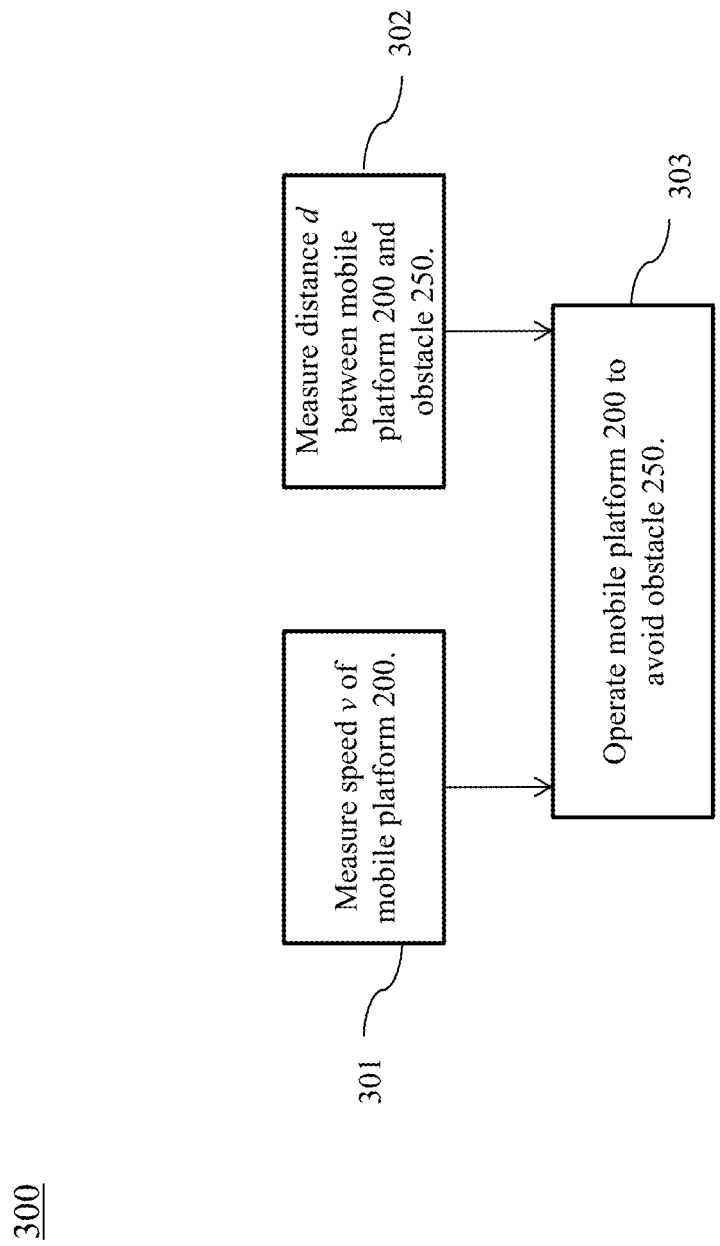
FIG. 3 is an exemplary top level flow chart illustrating an embodiment of a method for automatically operating the mobile platform using the mobile platform control system of FIG. 1.

Referring now to FIG. 3, one embodiment of a method 300 for operating a mobile platform 200 based on a detected distance d and speed v. At 301, the speed v of the mobile platform 200 is measured. In some embodiments, the speed v can be measured using a sensor 110 (shown in FIG. 2) mounted aboard the mobile platform 200. An exemplary sensor 110 for measuring speed v is an inertial measurement unit (IMU). Alternatively and/or additionally, the speed v can be measured using one or more cameras (for example, a conventional RGB sensor and/or a time-of-flight sensor 500 (shown in FIG. 5)) via stereopsis, as further described below with respect to FIGS. 10-12. At 302, the distance d between the mobile platform 200 and an obstacle 250 is acquired. As described herein, the distance d can be measured using a time-of-flight sensor 500, an ultrasound sensor 600 (shown in FIG. 6), other sensors 110, or a combination thereof. At 303, the speed v and the distance d are measured, and the mobile platform 200 is operated to avoid the obstacle 250.

Figure 4:
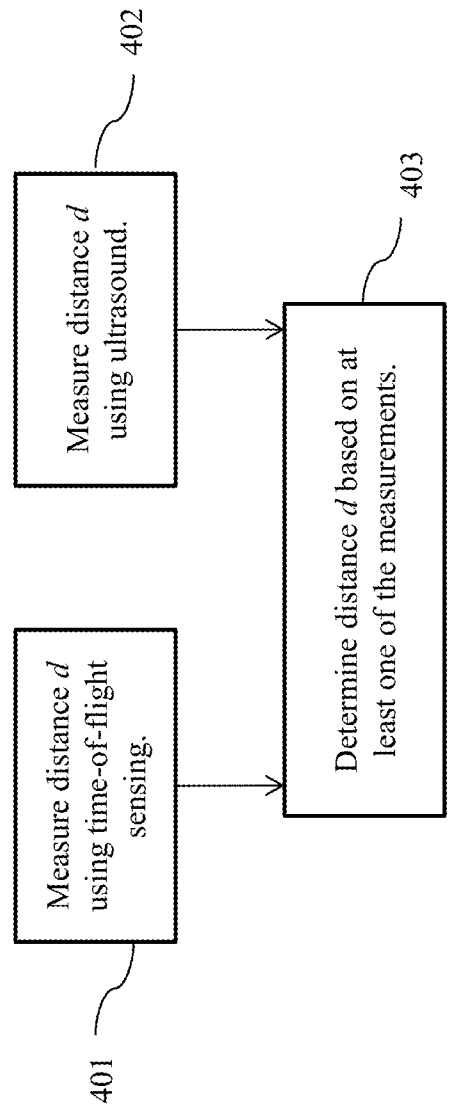
FIG. 4 is an exemplary flow chart illustrating an embodiment of a method for determining a distance between a mobile platform and an obstacle using the mobile platform control system of FIG. 1 based on at least one of time-of-flight sensing and ultrasound sensing.

Turning now to FIG. 4, an exemplary method for determining a distance d between a mobile platform 200 and an obstacle 250 (as shown in FIG. 1) is shown as using at least one of a time-of-flight measurement (also referred to herein as a first measurement) and an ultrasound measurement (also referred to herein as a second measurement). An advantage of using multiple sensors and/or sensor types for measuring the distance d to the obstacle 250 is that measurements are rendered more accurate by redundancy, and the measurements are more robust to limitations of particular sensors and/or sensor types. At 401, the distance d can be measured using a time-of-flight sensor 500 (shown in FIG. 5). At 402, the distance d can be measured using an ultrasound sensor 600 (shown in FIG. 6). At 403, the distance d can be determined based on at least one of the measurements obtained using time-of-flight and/or ultrasound.

Figure 5:
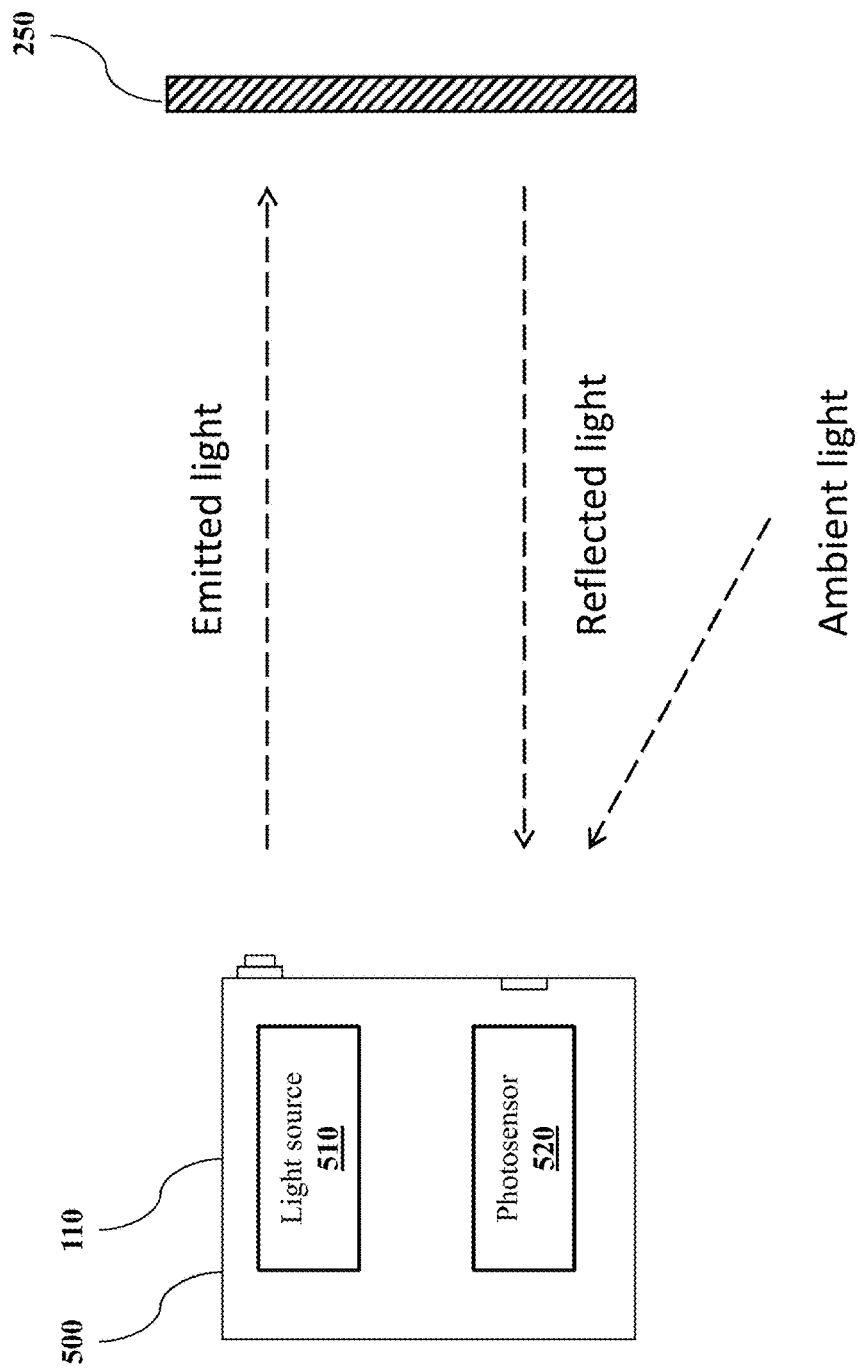
FIG. 5 is an exemplary diagram illustrating an embodiment of a time-of-flight sensor for distance determination.

Turning now to FIG. 5, an exemplary sensor 110 is shown as a time-of-flight sensor 500. The time-of-flight sensor 500 can include a light source 510 that can generate light (herein referred to equivalently as "illumination") within a predetermined frequency range. In one preferred embodiment, the light source 510 is a solid-state laser or light-emitting diode (LED). In another preferred embodiment, the light source generates illumination in an infrared range. In still another embodiment, the illumination is in a near infrared range. The light source 510 can emit light as pulsed signals and/or as a continuous wave.

Once generated by the light source 510, the light can be emitted toward the obstacle 250. Light reflected from the obstacle 250 can be detected by the time-of-flight sensor 500 using one or more photosensors 520 that can sense the reflected light and convert the sensed light into electronic signals. Each photosensor 520 of the time-of-flight sensor 500 can be, for example, a charge-coupled device (CCD), a complementary metal-oxide-semiconductor (CMOS), an N-type metal-oxide-semiconductor (NMOS) imaging devices, and hybrids/variants thereof. The photosensors can be arranged in a two-dimensional array (not shown) that can each capture one pixel of image information, collectively enabling construction of an image depth map 801 (shown in FIG. 8). The time-of-flight sensor 500 preferably has a quarter video graphics array (QVGA) or higher resolution— for example, a resolution of at least 0.05 Megapixels, 0.1 Megapixels, 0.5 Megapixels, 1 Megapixel, 2 Megapixels, 5 Megapixels, 10 Megapixels, 20 Megapixels, 50 Megapixels, 100 Megapixels, or an even greater number of pixels. Furthermore, the photosensor 520 can detect both reflected light from the obstacle 250 and ambient light. The time-of-flight sensor 500 can advantageously be configured to differentiate between reflected light (signal) and ambient light (noise). Once the reflected light is sensed, the distance d to the obstacle 250 can be measured according to the time-of-flight of the light signal, as further described below with reference to FIG. 7.

Figure 6:
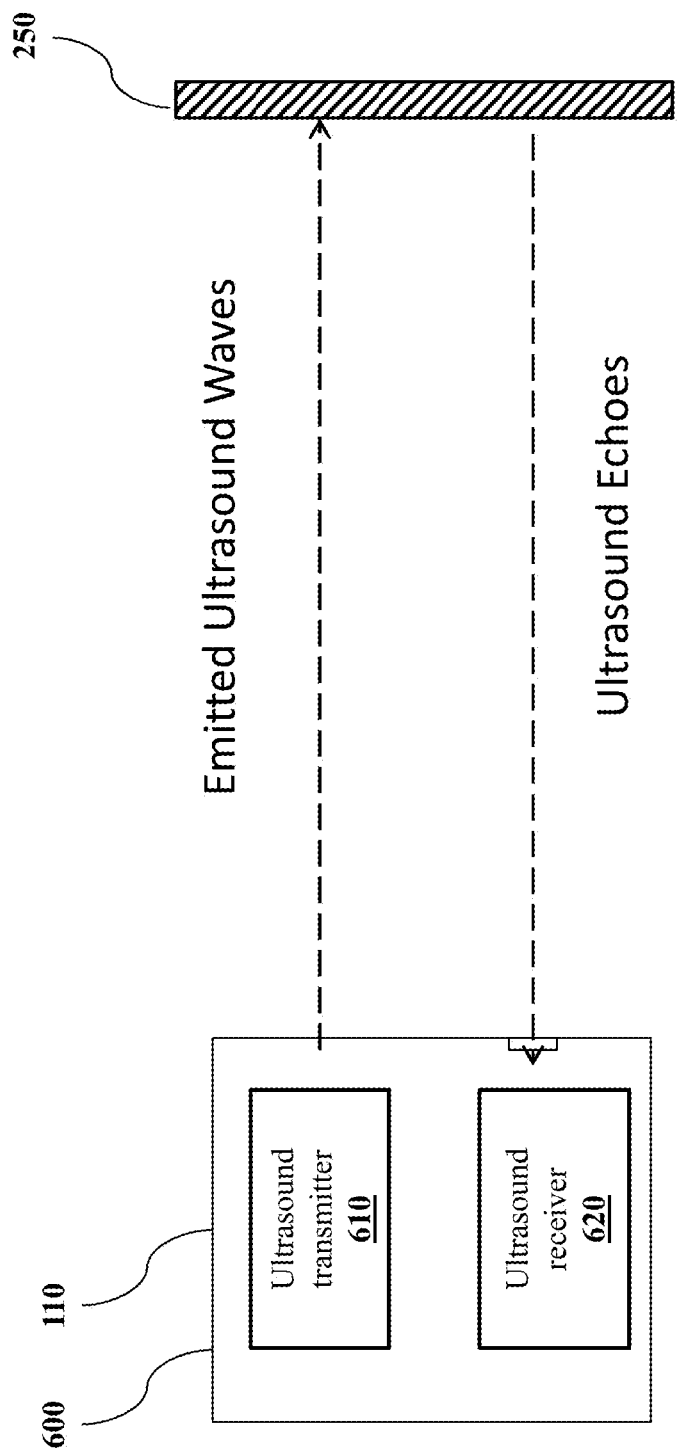
FIG. 6 is an exemplary diagram illustrating an embodiment of an ultrasound sensor for distance determination

Turning now to FIG. 6, an exemplary sensor 110 is shown as an ultrasound sensor 600. The ultrasound sensor 600 can emit ultrasound waves at high frequency and evaluate an ultrasound echo, which is received back after reflection by the obstacle 250. Based on time lapse between sending the ultrasound signal and receiving the echo, the distance d to the obstacle 250 can be determined. The ultrasound sensor 600 can include an ultrasound transmitter 610 and at least one ultrasound receiver 620. The ultrasound transmitter 610 and/or the ultrasound receiver 620 can each be an ultrasound transducer that converts electrical signals into ultrasound waves and vice versa. Exemplary ultrasound transducers include piezoelectric transducers and capacitive transducers. In some embodiments, the ultrasound sensor 600 can include an arrayed ultrasound transducer in a one-dimensional or two-dimensional configuration, enabling construction of an ultrasound depth map.

Although shown as distinct devices for illustrative purposes only, the sensors 110 of the mobile platform control system 100 can be integrated partially or fully into a single device, and share overlapping physical components such as housing, microchips, photosensors, detectors, communications ports, and the like. For example, in some embodiments, the time-of-flight sensor 500 can share a processor 120 (shown in FIG. 2) with the ultrasound sensor 600. In other embodiments, the sensors 110 can be physically discrete devices for easy of replacement and modularity.

Figure 7:
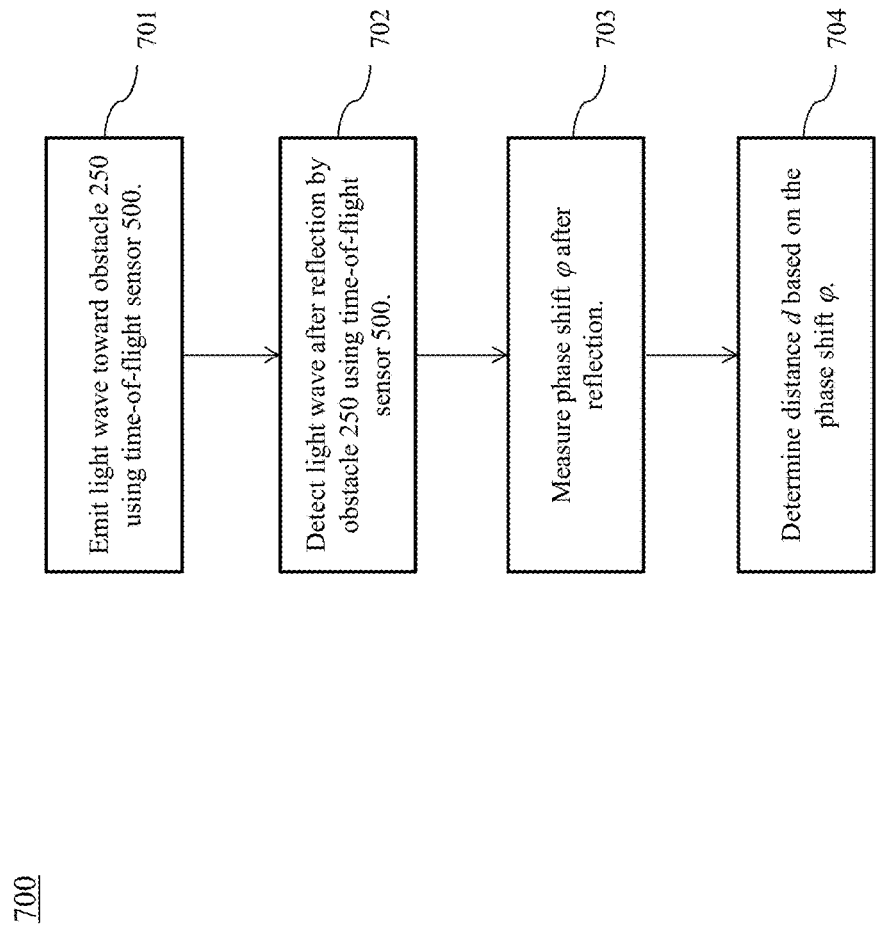
FIG. 7 is an exemplary flow chart illustrating an embodiment of the method of FIG. 3 for determining distance using a phase-shift process.

Turning now to FIG. 7, an exemplary method 700 for using a time-of-flight sensor 500 for measuring a distance d and a speed v is shown. At 701, a light source 510 (shown in FIG. 5) of the time-of-flight sensor 500 can emit a light wave toward the obstacle 250. In one embodiment, the emitted light is a pulse emitted by the light source 510 for a brief period of time. In another embodiment, the light is emitted by the light source 510 as a continuous wave (for example, a sinusoid or square wave).

At 702, after reflection by the obstacle 250, the reflected light is detected. The reflected light can be detected using one or more photosensors 520 (shown in FIG. 5) of the time-of-flight sensor 500. The light detection process depends on the process by which the light is emitted. Where the light is emitted as a continuous wave, a phase-shift process can be used to detect the emitted light, thereby allowing measurement of the time-of-flight of the light and hence the distance d.

An exemplary embodiment of the phase-shift process is illustrated by a process in which the time-of-flight sensor 500 emits a light wave as sinusoidal signal as a function of time, g(t), represented as follows:

$$g(t) = \cos(\omega t) \quad \text{Equation (1)}$$

where t represents time and ω represents the modulation frequency of the emitted light. After the light wave is reflected, the reflected light wave is detected by a photosensor 520 and can be presented as the following function h(t):

$$h(t) = b + a\cos(\omega t + \varphi) \quad \text{Equation (2)}$$

where t represents time, a represents an amplitude of the reflected light wave, b represents a constant bias of the reflected light wave, and φ represents a phase shift of the reflected light wave relative to the emitted light wave.

At 703, the phase shift φ between the emitted light wave and the reflected light wave is measured. In an exemplary method, the measurement can be performed by sampling a cross-correlation function c(τ) between the emitted light wave g(t) and the reflected light wave h(t) as follows:

$$c(\tau) = h * g = \int_{-\infty}^{\infty} h(t)g(t+\tau)dt \quad \text{Equation (3)}$$

where τ represents an internal offset for computing the cross-correlation function. The cross-correlation function can be simplified to:

$$c(\tau) = a/2 \cos(\omega \tau + \varphi) + b \quad \text{Equation (4)}$$

The cross-correlation function c(τ) can be sampled, for example, at four sequential times, each with different internal offset τ. For example, sampling values of τ can be at angles of 0, π/2, π, and 3π/2, giving four values of the cross-correlation function $A_1$, $A_2$, $A_3$, and $A_4$, respectively. The desired parameters of the reflected light wave—the amplitude a, constant bias b, and phase shift φ—can be obtained from $A_1$, $A_2$, $A_3$, and $A_4$ as follows:

$$\varphi = \arctan((A_1 - A_3)/(A_2 - A_4)) \quad \text{Equation (5)}$$

$$a = \frac{\sqrt{(A_1 - A_3)^2 + (A_2 - A_4)^2}}{2} \quad \text{Equation (6)}$$

$$b = (A_1 + A_2 + A_3 + A_4)/4 \quad \text{Equation (7)}$$

Finally, at 704, the distance d can be determined according to the measured phase shift φ. In one embodiment, the distance d is linearly proportional to the phase shift φ. In one embodiment, the distance d can be determined from the phase shift φ according to the following equation:

$$d = c\varphi/4\pi f_{mod} \quad \text{Equation (8)}$$

where c is the speed of light and $f_{mod}$ is the modulation frequency.

Figure 8:
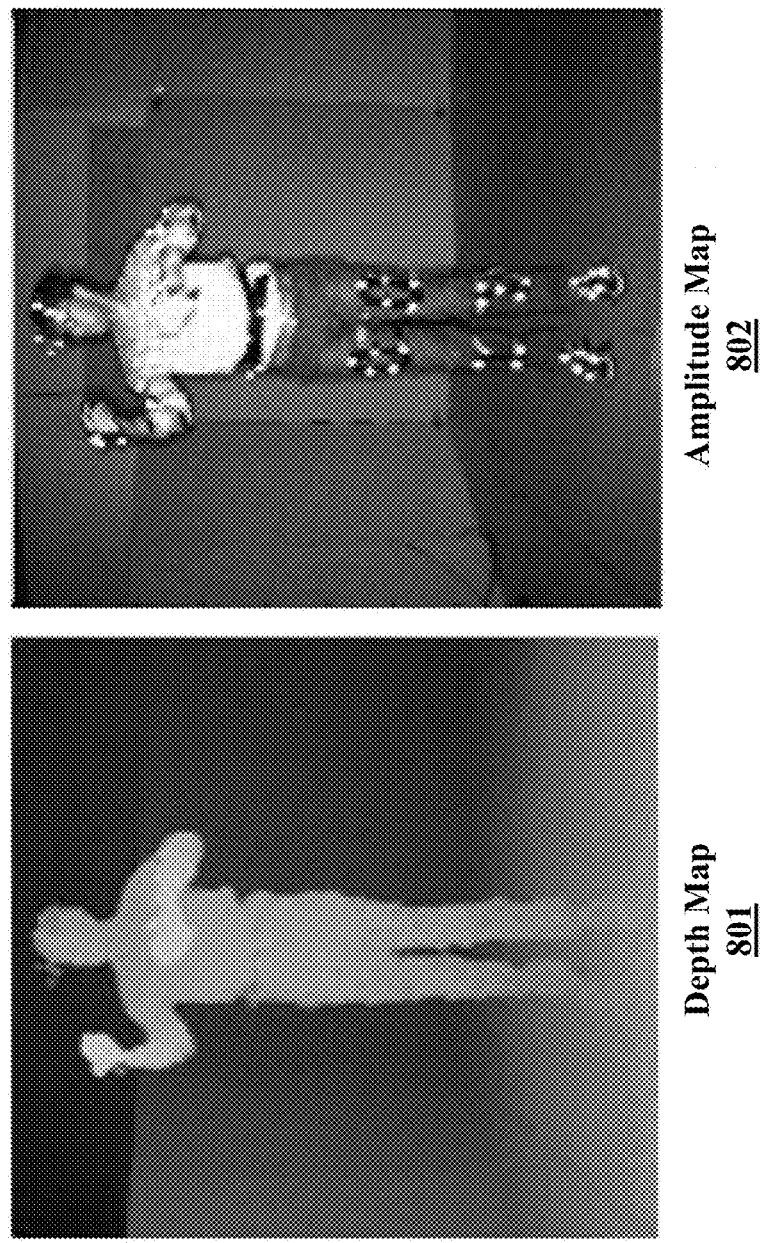
FIG. 8 is an exemplary diagram illustrating examples of a depth map and an amplitude map generated using a phase-shift process.

Turning now to FIG. 8, an exemplary depth map 801 and an exemplary amplitude map 802 are shown based on a time-of-flight sensor 500 imaging of a particular object. For example, the depth map 801 can be found according to a distance d for each photosensor 520 in a two-dimensional array. The depth map 801 thereby depicts an operating environment surrounding the time-of-flight sensor 500 and a mobile platform 200 to which the time-of-flight sensor 500 is mounted. Farther objects are shown in darker tones while closer objects are shown in lighter tones. The amplitude map 802 represents the amplitude a (not shown in FIG. 8) for each photosensor 320 in the two-dimensional array, thereby depicting the operating environment in grayscale. The values of d and a used to construct the depth map 801 and amplitude map 802, respectively, can be obtained using a phase-shift method, as described above. Finally, the constant bias b (not shown in FIG. 8) which reflects the amount of ambient lighting sensed by the photosensors 520, is not depicted in the exemplary depth map 801 and the exemplary amplitude map 802 shown in FIG. 7, but can be used in other aspects of the systems and methods described herein.

In some embodiments, the depth map 801 and/or the amplitude map 802 can be generated a combined (or composite) maps formed using data from multiple sensors 110. For example, a depth map generated by a time-of-flight sensor 500 can be combined with a depth map generated by an ultrasound sensor 600 (for example, using an arrayed transducer). The combined depth map can be used to determine the distance d between the mobile platform 200 and the obstacle 250.

Figure 9:
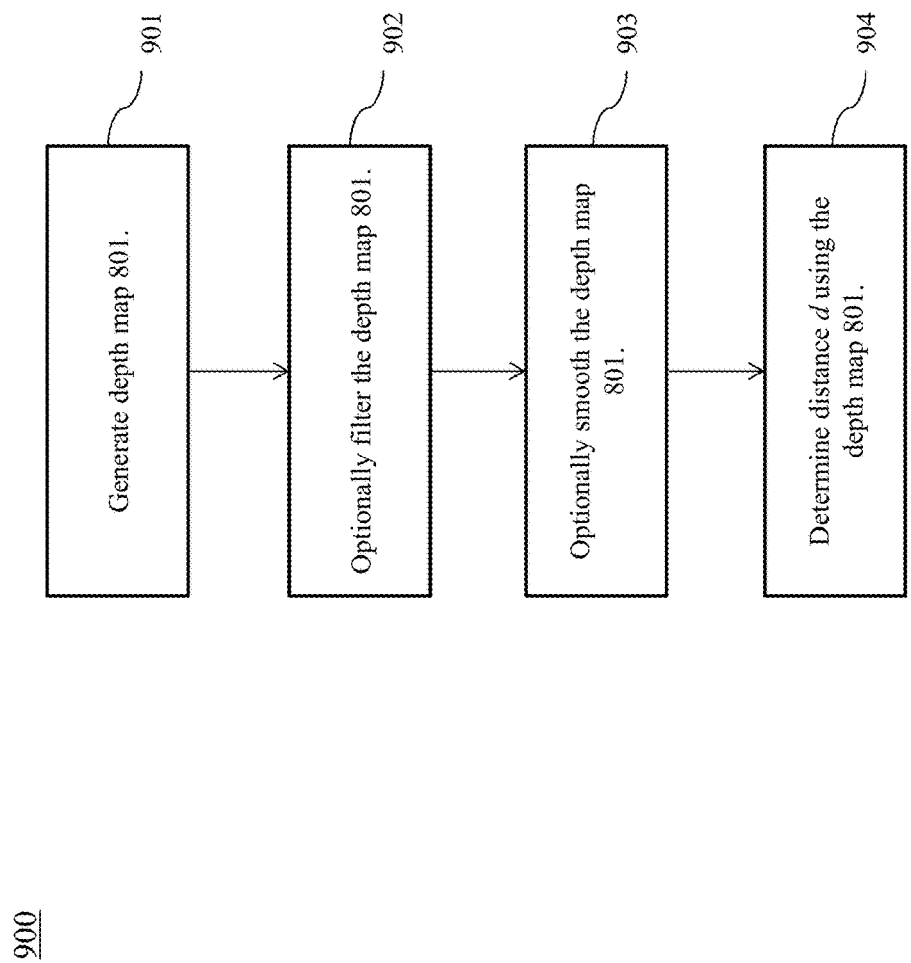
FIG. 9 is an exemplary flow chart illustrating an embodiment of the method of FIG. 3 for determining distance using a depth map.

Turning now to FIG. 9, an exemplary method of determining a distance d between a mobile platform 200 (shown in FIG. 1) and an obstacle 250 (shown in FIG. 1) using a depth map 801 is shown. At 901, the depth map 801 is generated using any of the methods described herein. For example, a depth map 801 suitable for distance determination can be generated using a time-of-flight sensor 500, as described above with respect to FIG. 7. Alternatively and/or additionally, a depth map 801 suitable for distance determination can be generated using an ultrasound sensor 600 (shown in FIG. 6) or using other distance or depth determination methods.

At 902, the depth map can optionally be filtered to remove data artifacts or noise that can adversely affect accurate distance determination. For example, malfunctioning photosensors 510 in a time-of-flight sensor 500 (shown in FIG. 3) can create pixels that are either too dark or too bright. Filtering can also be performed based on determining an error variance for each of the pixels of the depth map 801. For example, an error variance dR for a given pixel of the depth map 801 generated by a time-of-flight sensor 500 can be measured according to Equation (9):

$$dR = \frac{1}{\sqrt{N_{phase}}} \cdot \frac{1}{k \cdot \frac{S}{N}} \cdot \frac{\lambda_{mod}}{\sqrt{8} \cdot \pi} \qquad \text{Equation (9)}$$

where $k_{tot}$ is the modulation contrast, a property of the sensor, S is the intensity of the reflected light, N is the intensity of ambient light, $\lambda_{mod}$ is the wavelength of the light, and $N_{phase}$ is the number of measurements taken. Here, the error variance dR can be reduced by taking a larger number of measurements and increasing the sampling size. After determining the error variance dR for each pixel, one or more pixels of the depth map 801 can be discarded during filtering. For example, pixels having an error variance dR above a predetermined threshold can be discarded during filtering. In some embodiments, the predetermined threshold for filtering can be a predetermined percentage—for example, 1 percent, 2 percent, 5 percent, 10 percent, 20 percent, or more—of the pixel intensity.

At 903, the depth map 801 can optionally be smoothed to remove potential imaging artifacts and/or noise. Exemplary methods suitable for smoothing a depth map 801 include, for example, additive smoothing, applying a digital filters, applying a Kalman filter, Kernel smoothing, Laplacian smoothing, Gaussian smoothing, applying a low-pass filter, applying a high-pass filter, smoothing based on curve fitting, regression, using a moving average, exponential smoothing, and other methods.

At 904, the distance d between the mobile platform 200 and the obstacle 250 can be determined using the depth map 801. The obstacle 250 can be identified with the depth map 801 in any desired manner. For example, a visual profile of the obstacle 250 can be pre-configured, and the depth map 801 can be scanned for a location of the obstacle 250 based on the visual profile. The obstacle 250 can be identified based on machine vision and/or artificial intelligence methods, and the like. Suitable methods include feature detection, extraction and/or matching techniques such as RANSAC (RANdom SAmple Consensus), Shi & Tomasi corner detection, SURF blob (Speeded Up Robust Features) detection, MSER blob (Maximally Stable Extremal Regions) detection, SURF (Speeded Up Robust Features) descriptors, SIFT (Scale-Invariant Feature Transform) descriptors, FREAK (Fast REtinA Keypoint) descriptors, BRISK (Binary Robust Invariant Scalable Keypoints) descriptors, HOG (Histogram of Oriented Gradients) descriptors, and the like. Alternatively, where the obstacle 250 is unknown, a set of objects in the depth map 801 that are closest to the mobile platform 200 can be assumed to be potential obstacles. Size and shape restrictions can be applied to filter out potential obstacles avoid false obstacle readings, as desired.

Once an obstacle 250 is identified within the depth map 801, the relevant distance d for purposes of mobile platform operation can be determined. For example, the distance d to the center-of-mass of the obstacle 250 may be used for mobile platform navigation and obstacle avoidance purposes. As another example, the distance d to a point on the obstacle 250 that is closest to the mobile platform 200 may be used as the operative distance. In some embodiments where multiple obstacles 250 are considered, a set of distances d for the respective obstacles 250 can be considered in totality for mobile platform control and navigation.

Figure 10:
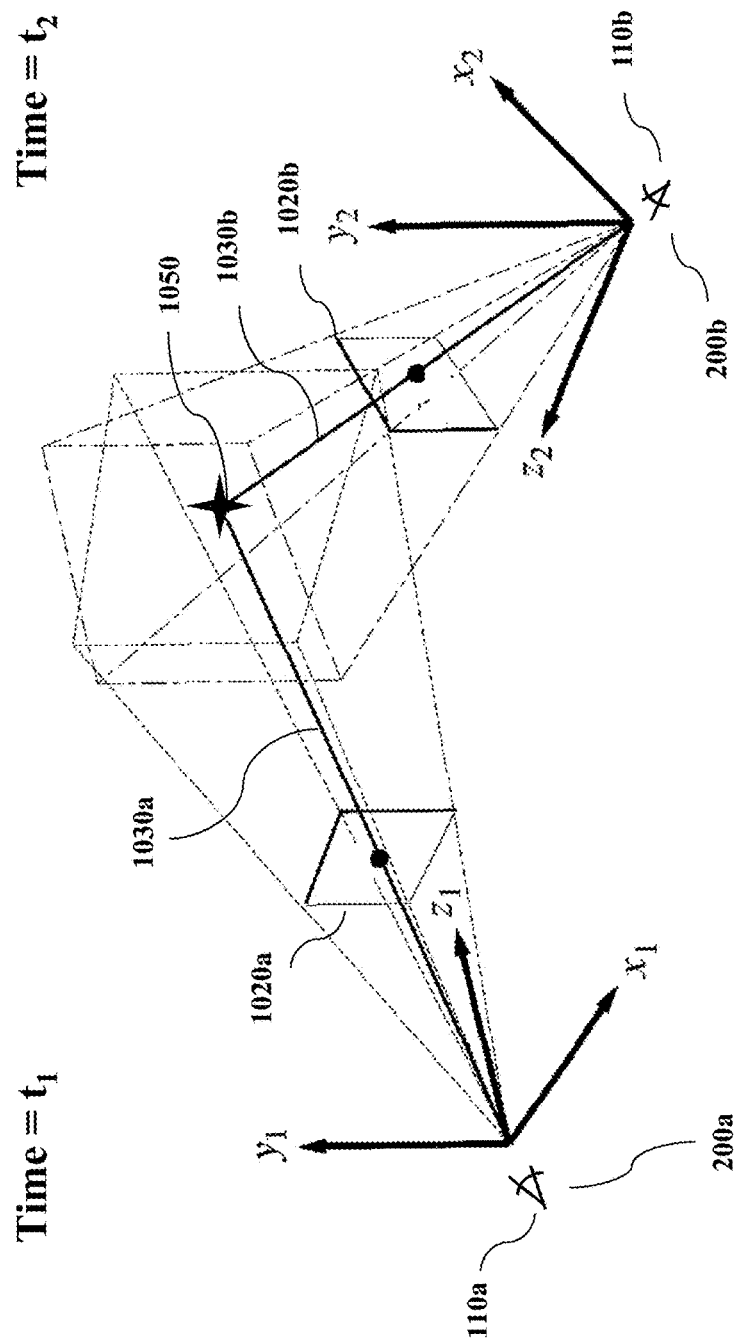
FIG. 10 is an exemplary diagram illustrating an embodiment of a process for determining speed using stereopsis.

Turning now to FIG. 10, a method of determining a speed v of a mobile platform 200 (shown in FIG. 1) using stereopsis is shown. The mobile platform 200 is depicted at two time points, an initial time point $t_1$ (at which the mobile platform 200 is represented as reference numeral 200a) and a subsequent time point $t_2$ (at which the same mobile platform 200 is represented as reference numeral 200b). At the initial time point $t_1$ a sensor 110a of the mobile platform 200a has a line of vision 1030a directed toward a reference point 1050. Based on this line of vision, the sensor 110a captures a first image 1020a at time point $t_1$. At the subsequent time point $t_2$, the sensor (now designated as reference numeral 110b) has a different line of vision 1030b directed toward the reference point 1050. Based on this subsequent line of vision, the sensor 110b captures a second image 1020b at time point $t_2$. A displacement Δ of the sensor 110, and hence of the mobile platform 200, can be found using a binocular disparity (also referred to herein as a disparity) b between the first image 1020a and the second image 1020b, as further described below with reference to FIG. 10. After finding the displacement Δ, the speed v can be determined based on the displacement Δ and the time lapse between time point $t_1$ and time point $t_2$.

The reference point 1050 can be any point within an operating environment of the mobile platform 200. In some embodiments, the reference point 1050 is a point within an operating environment under the mobile platform. Particular in embodiments where the mobile platform 200 is an aerial vehicle (for example, an unmanned aerial vehicle or "UAV"), using a reference point 1050 under the mobile platform 200 can be used where other reference points 1050 are unavailable.

Figure 11:
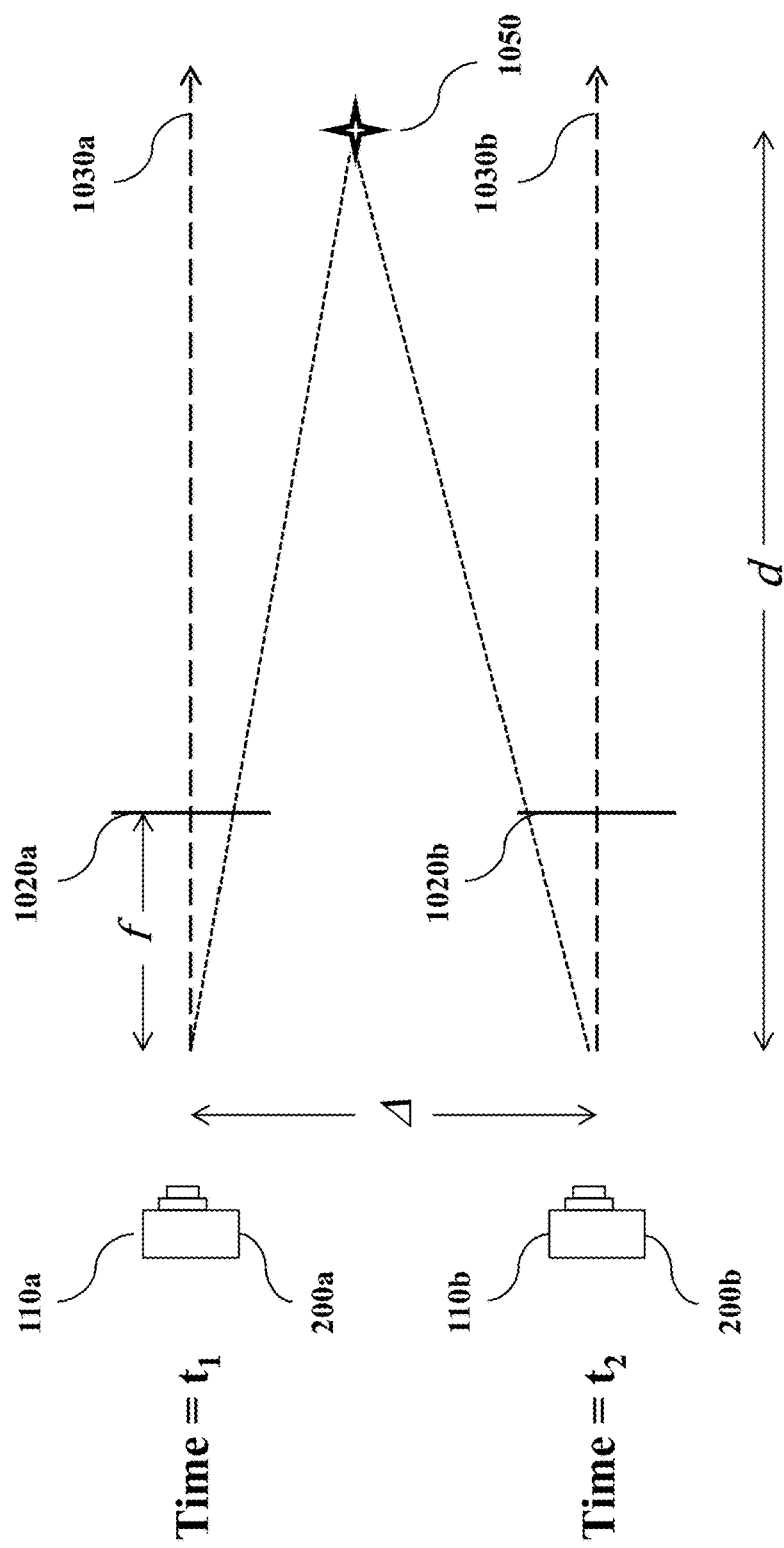
FIG. 11 is an exemplary diagram illustrating an embodiment of the process of FIG. 10 for using triangulation to determine speed.

Turning now to FIG. 11, the first image 1020a captured at time point $t_1$ can be compared to the second image 1020b captured at time point $t_2$ to ascertain the displacement Δ using the method of triangulation. Specifically, the displacement Δ can be given as follows:

$$\Delta = \frac{bd}{f} \quad \text{Equation (10)}$$

where b is the binocular disparity between the first image 1020a and the second image 1020b, f is the focal length of the sensor 110, and d is the distance between the sensor 110 and the reference point 1050. Here, any change in the distance d between time point $t_1$ and time point $t_2$ can be assumed to be negligible provided that the gap between time point $t_1$ and time point $t_2$ is small. Finally, the binocular disparity b can be found based on the positional difference between the reference point 1050 in the first image 1020a and the second image 1020b. As described above with respect to FIG. 8, a variety of feature detection, extraction and/or matching techniques can be used to identify corresponding reference points 1050 between the first image 1020a and the second image 1020b.

In some embodiments, the sensor 110 used to detect speed v via stereopsis can be a time-of-flight sensor 500 (shown in FIG. 5). The time-of-flight sensor 500 can obtain an amplitude map 802 (shown in FIG. 8) having the reference point 1050. The amplitude map 802, which is a grayscale image, can be used as the first image 1020a and the second image 1020b for determining the displacement Δ using the triangulation method described above.

Figure 12:
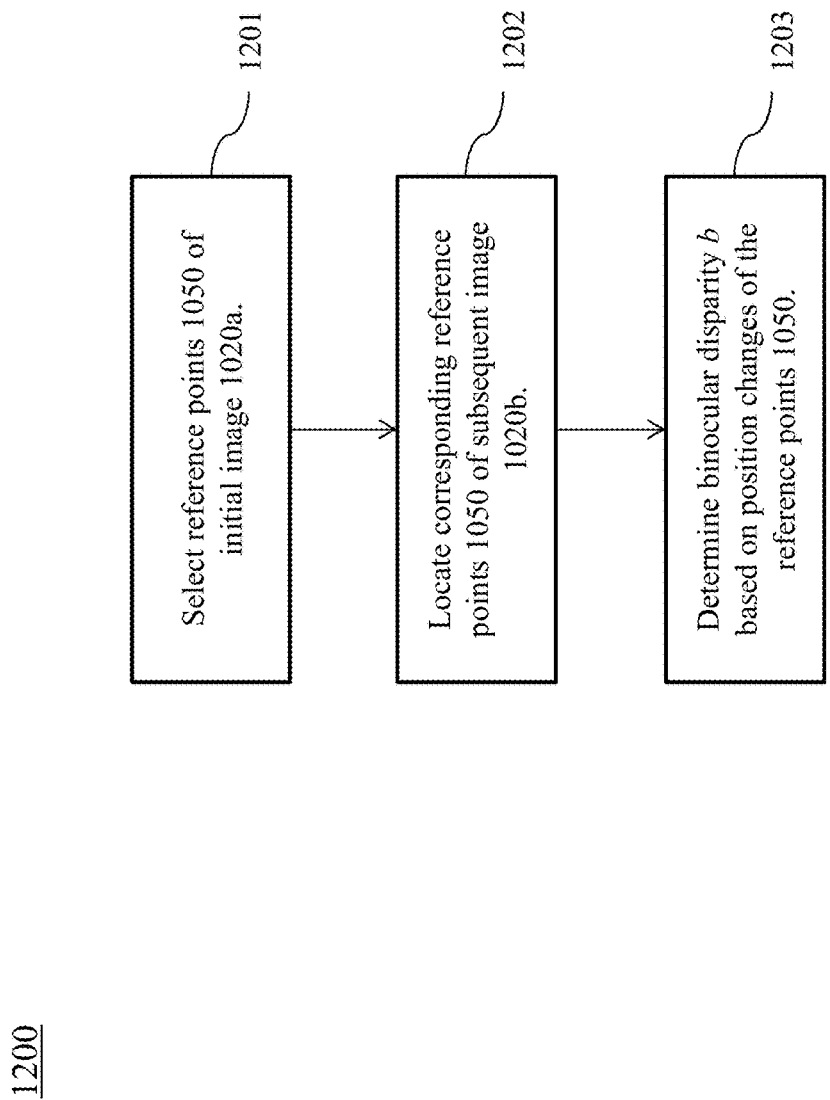
FIG. 12 is an exemplary flow chart illustrating an embodiment of the method of FIG. 3 for determining binocular disparity.

Turning now to FIG. 12, an exemplary method 1200 is shown for determining a binocular disparity b between the first image 1020a and the second image 1020b using a plurality of reference points 1050 that appear in both the first image 1020a and the second image 1020b. At 1201, a plurality of reference points 1050 can be selected. The reference points 1050 can be selected using a variety of different methods. In one exemplary embodiment, the reference points 1050 are selected as pre-defined shapes. In another embodiment, the reference points 1050 are selected as having a particular color or intensity. In another embodiment, the reference points 1050 are selected as random portions of the first image 1020a or the second image 1020b that overlap with one another. In another embodiment, the reference points 1050 are selected at regularly spaced intervals, for example, every pixel, every other pixel, every third pixel, every fourth pixel, and so forth. The reference points 1050 can take varying shapes and sizes, as desired. In some embodiments, a combination of methods described above can be used to select the reference points 1050.

At 1202, points on the second image 1020b that correspond to the selected reference points 1050 are located. Again, a variety of feature detection, extraction and/or matching techniques can be used to identify corresponding reference points 1050 between the first image 1020a and the second image 1020b.

At 1203, the binocular disparity b can be determined based on changes in position of each of the reference points 1050 between the first image 1020a and the second image 1020b. Any of a variety of methods can be used to determine the binocular disparity b based on changes in position of the individual reference points 1050. In one embodiment, the binocular disparity b is found based on an average of the changes in position. Exemplary types of averages can include an arithmetic mean, a geometric mean, a median, or a mode. In another embodiment, the binocular disparity b is found based on a subset of the reference points 1050. Advantages of computing the binocular disparity b from a subset of reference points 1050 can include, for example, being able to filter out noise, being able to filter out reference points 1050 that are too far (or too close), or being able to filter out reference points 1050 based on intensity.

Figure 13:
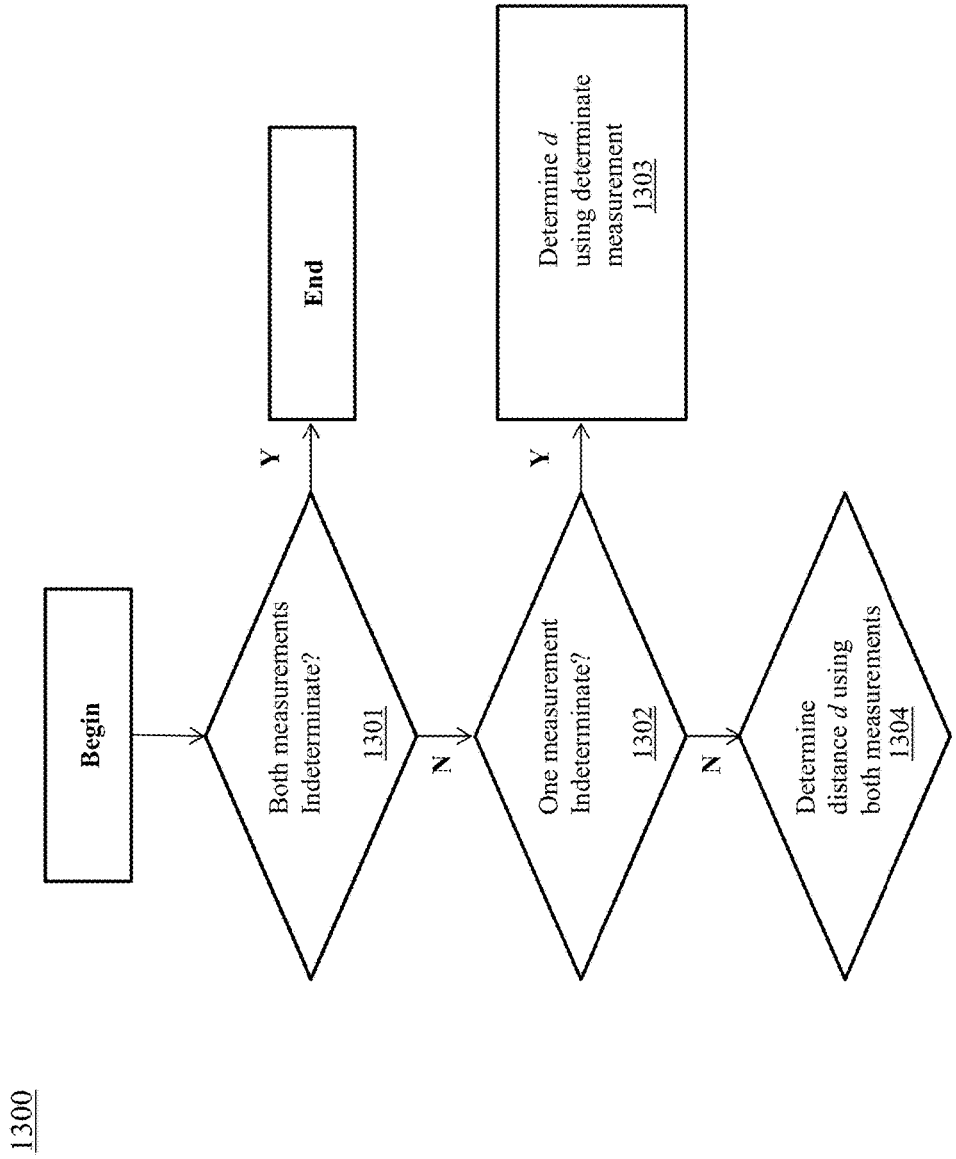
FIG. 13 is an exemplary decision flow chart illustrating an embodiment of a method for determining distance.

Turning now to FIG. 13, a method 1300 is shown for determining the distance d between a mobile platform 200 (shown in FIG. 1) and an obstacle 250 (shown in FIG. 1) based on measurements from multiple sensors and/or sensor types. Though the method 1300 is shown with respect to a measurement by a time-of-flight sensor 500 (also referred to as a first measurement) and an ultrasound sensor 600 (also referred to as a second measurement) for illustrative purposes only, the method is not limited to using such sensors.

At 1301, whether both the first measurement and the second measurement are indeterminate can be determined. An indeterminate distance measurement can arise is several situations. For example, the distance d of the obstacle 250 may exceed the detection range of the sensor 110. Since ultrasound sensors have limited range (for example, 10 meters or less), distant objects can give indeterminate ultrasound distance measurements. As another example, an indeterminate distance measurement can arise where interference with the emitted signal (for example, emitted light or ultrasound) prevents the receiving of a signal reflected from the obstacle 250. As another example, an indeterminate distance measurement can arise where the signal-to-noise ratio is low—for example, for a time-of-flight sensor operating under intense ambient lighting. If both measurements are indeterminate, then the method 1300 ends since there is insufficient information to determine the distance d; otherwise, the method 1300 proceeds to 1302. At 1302, it is determined whether either first measurement or the second measurement is indeterminate. If one measurement is indeterminate, at 1303, the distance d is taken to be the first measurement upon a determination that the second measurement is indeterminate. Similarly, at 1303, the distance d is taken to be the second measurement upon a determination that the first measurement is indeterminate.

If neither the first measurement nor the second measurement is indeterminate, then the method 1300 proceeds to 1304. At 1304, several ways of resolving different measurements to determine a single distance d can be used. In one embodiment, the distance d can be determined as being the shorter of the first measurement and the second measurement. This embodiment advantageously assumes that one sensor 110 has accurately detected a nearby obstacle 250, and avoids collision in the event that another sensor 110 measures distance inaccurately or is malfunctioning. This principle of relying on the shortest distance measurement can be applied generally to detection using more than two sensors.

In another embodiment, the distance d can be determined according to an error variance of the first measurement and/or an error variance of the second measurement. For example, when the error variance of the first measurement is above a predetermined threshold, the distance d can be determined to be the second measurement. Similarly, when the error variance of the second measurement is above a predetermined threshold, the distance d can be determined to be the first measurement. In some embodiments, the predetermined threshold can be a predetermined percentage—for example, 1 percent, 2 percent, 5 percent, 10 percent or more—of the measurement value. Where the error variances of both the first measurement and the second measurement are within thresholds, the distance can be determined by weighting the error variances. For example, the distance can be determined as a weighted average of the first measurement and the second measurement, where the weights are proportional to the error variances of the measurements. The error variances for sensors 110 can be determined in a variety of ways. For example, an error variance for a time-of-flight sensor 500 can be found using Equation (9).

In another embodiment, the relative weight of a measurement taken by a time-of-flight sensor 500 can be determined according to an ambient light level surrounding the time-of-flight sensor 500. The ambient light level can be measured in various ways. For example, the ambient lighting can be measured via the time-of-flight sensor 500 itself, or using a separate sensor 110. Where the ambient lighting is measured via the time-of-flight sensor 500, the ambient lighting can be measured as a constant bias b of a cross-correlation between an emitted light wave and a corresponding received light wave, as described above with respect to FIG. 7 and Equation (7).

In another embodiment, certain sensors 210 or types of sensors 210 can be given a higher relative weight based on an intrinsic accuracy or reliability of the sensor or sensor type. In some embodiments, a time-of-flight sensor 500 can be weighted more than an ultrasound sensor 600. In some embodiments, the time-of-flight sensor 500 can be weighted less than the ultrasound sensor 600. In some embodiments, the mobile platform control system 100 can have a default setting of using either the time-of-flight sensor 500 or the ultrasound sensor 600 even if the other is determinate, since a particular sensor or sensor type is more trustworthy.

Figure 14:
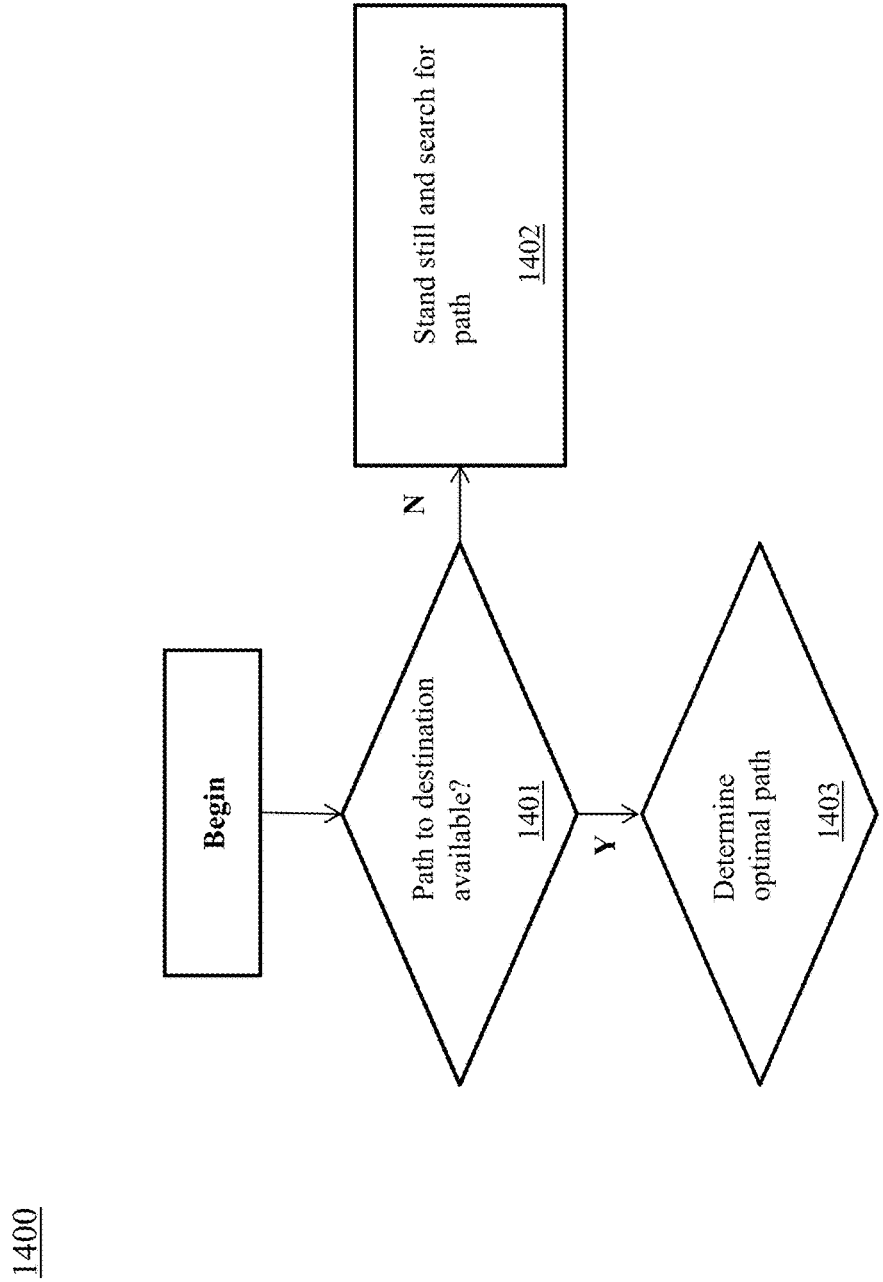
FIG. 14 is an exemplary decision flow chart illustrating an embodiment of a method for controlling a mobile platform according to a speed and/or distance.

Turning now to FIG. 14, an exemplary method 1400 for controlling a mobile platform 200 is shown, where the mobile platform control system 100 can adjust the speed and/or the direction of the mobile platform 200 to avoid collision with the obstacle 250. Controlling the mobile platform 200 can depend, for example, on the distance d and speed v detected by sensors 110. Without limitation, a processor 120 of the mobile platform control system 100 can be configured to perform any operations for mobile platform navigation and obstacle avoidance.

At 1401, the mobile platform control system 100 can determine whether the mobile platform 200 has an available path to its destination according to the positions of surrounding obstacles 250. If the currently available information does not show that a path is available, at 1402, the mobile platform 200 can be controlled to maintain a fixed position (for example, come to a hover for aerial vehicles). After maintaining the fixed position for a selected period of time, the mobile platform 200 can be controlled to adjust the orientation and/or search for a viable path. If a path is available, at 1403, the mobile platform control system 100 can determine an optimal path based on that information and adjust the speed and/or heading of the mobile platform 200 accordingly. In some cases, where no obstacles 250 impede the current path, no adjustment of the speed or heading of the mobile platform 200 is needed.

In some embodiments, the method 1400 of controlling the mobile platform 200 using the mobile platform control system 100 can depend on the types of sensors 110 used for detecting the distance d and/or the speed v. For example, since a time-of-flight sensor 500 typically has a longer range than an ultrasound sensor 600, the mobile platform 200 can be configured to decelerate gradually in response to obstacles 250 detected by the time-of-flight sensor 500, but decelerate suddenly in response to obstacles 250 detected by the ultrasound sensor 600.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for operating a mobile platform, comprising:
    measuring a distance between the mobile platform and an obstacle via time-of-flight sensing or ultrasound sensing, including:
        performing, by a time-of-flight sensor, a first measurement on the distance via time-of-flight sensing;
        performing, by an ultrasound sensor, a second measurement on the distance via ultrasound sensing;
        determining, by a processor, at least one of the first measurement or the second measurement is determinate;
        determining, by a processor, the distance based on the at least one of the first measurement or the second measurement that is determinate;
    measuring, by a sensor, a speed of the mobile platform; and
    controlling, by a processor, a movement of the mobile platform according to the measured distance and the measured speed, a controlling method for controlling the movement of the mobile platform depending on which one or both of the time-of-flight sensor and the ultrasound sensor are used for measuring the distance.

2. The method of claim 1, wherein said measuring the distance via time-of-flight sensing comprises measuring the distance via a phase-shift process.

3. The method of claim 2, wherein said measuring the distance via the phase-shift process comprises:
    emitting a light wave toward the obstacle;
    detecting the light wave after reflection by the obstacle as a reflected light wave;
    measuring a phase shift between the emitted light wave and the reflected light wave; and
    determining the distance according to the phase shift.

4. The method of claim 1, wherein said measuring the distance via time-of-flight sensing comprises:
    generating a time-of-flight depth map of an operating environment of the mobile platform; and
    measuring the distance according to the time-of-flight depth map.

5. The method of claim 1, wherein:
    both the first measurement and the second measurement are determinate, and
    said measuring the distance further comprises:
        determining the distance as being the smaller of the first measurement and the second measurement.

6. The method of claim 1, wherein:
both the first measurement and the second measurement are determinate, and
said measuring the distance further comprises:
determining an ambient light level adjacent to the mobile platform; and
determining the distance by weighting the first measurement relative to the second measurement according to the ambient light level.

7. The method of claim 6, wherein said determining the ambient lighting comprises determining the ambient lighting via time-of-flight sensing.

8. The method of claim 7, wherein determining the ambient lighting via time-of-flight sensing comprises determining a constant bias of a cross-correlation between an emitted light wave and a corresponding received light wave.

9. The method of claim 1, wherein said measuring the distance further comprises:
generating a time-of-flight depth map of surroundings of the mobile platform;
generating an ultrasound depth map of the surroundings;
combining the time-of-flight depth map and the ultrasound depth map into a combined depth map; and
determining the distance via the combined depth map.

10. The method of claim 1, wherein said measuring the speed comprises measuring the speed via stereopsis.

11. The method of claim 10, wherein said measuring the speed via stereopsis comprises:
acquiring a first image of an operating environment of the mobile platform;
acquiring a second image of the operating environment subsequent to said acquiring the first image; and
measuring the speed based on the first image and the second image.

12. The method of claim 11, wherein:
said acquiring the first image comprises acquiring a first gray-scale image map via time-of-flight sensing; and
said acquiring the second image comprises acquiring a second gray-scale image map via time-of-flight sensing.

13. The method of claim 11, wherein said measuring the speed based on the first image and the second image comprises:
determining a disparity between the first image and the second image;
determining a displacement between the first image and the second image according to the disparity; and
determining the speed according to the displacement.

14. The method of claim 13, wherein said determining the disparity comprises:
selecting a plurality of reference points of the first image;
locating a plurality of points of the second image corresponding to the reference points; and
determining the disparity according to position changes of the reference points.

15. The method of claim 1, wherein said measuring the speed comprises measuring the speed via an inertial measurement unit.

16. The method of claim 1, wherein said controlling the mobile platform comprises automatically adjusting a speed of the mobile platform to avoid the obstacle according the measured distance and the measured speed.

17. A system for operating a mobile platform, comprising:
a time-of-flight sensor for sensing an operating environment of the mobile platform;
an ultrasound sensor for sensing the operating environment; and
a processor configured to:
determine a distance between the mobile platform and an obstacle in the operating environment using at least one of the time-of-flight sensor and the ultrasound sensor, including:
performing, by a time-of-flight sensor, a first measurement on the distance via time-of-flight sensing;
performing, by an ultrasound sensor, a second measurement on the distance via ultrasound sensing;
determining, by a processor, at least one of the first measurement or the second measurement is determinate;
determining, by a processor, the distance based on the at least one of the first measurement or the second measurement that is determinate; and
control a movement of the mobile platform according to the measured distance and a speed of the mobile platform, a controlling method for controlling the movement of the mobile platform depending on which one or both of the time-of-flight sensor and the ultrasound sensor are used for measuring the distance.

18. The system of claim 17, wherein said processor is configured to determine the distance via a phase-shift process.

19. The system of claim 17, wherein said processor is configured to determine the distance as being the smaller of a time-of-flight measurement and an ultrasound measurement.

20. The system of claim 17, wherein:
both the first measurement and the second measurement are determinate, and
said processor is configured to determine the distance by:
determining an ambient light level in the operating environment; and
determining the distance by weighting the first measurement relative to the second measurement according to the ambient light level.

21. The system of claim 17, wherein said processor is configured to measure the distance by:
generating a time-of-flight depth map of the operating environment;
generating an ultrasound depth map of the operating environment;
combining the time-of-flight depth map and the ultrasound depth map into a combined depth map; and
determining the distance via the combined depth map.

22. The system of claim 17, wherein said processor is configured to measure the speed via stereopsis.

23. The system of claim 22, wherein said processor is configured to measure the speed via stereopsis by:
acquiring a first image of the operating environment;
acquiring a second image of the operating environment subsequent to said acquiring the first image; and
detecting the speed based on the first image and the second image.

24. The system of claim 23, wherein said processor is configured to measure the speed by:
determining a disparity between the first image and the second image;
determining a displacement between the first image and the second image according to the disparity; and
determining the speed according to the displacement.

25. The method of claim 24, wherein said processor is configured to determine the disparity by:

selecting a plurality of reference points of the first image;
locating a plurality of points of the second image corresponding to the reference points; and
determining the disparity according to position changes of the reference points.

26. The system of claim 17, wherein said processor is configured to measure the speed via an inertial measurement unit mounted aboard the mobile platform.

27. The system of claim 17, wherein the time-of-flight sensor and the ultrasound sensor are mounted aboard the mobile platform.

28. The system of claim 17, wherein the mobile platform is an unmanned aerial vehicle.

29. An apparatus, comprising:
one or more processors configured for:
 determining a distance between a mobile platform and an obstacle via time-of-flight sensing or ultrasound sensing, including:
  performing, by a time-of-flight sensor, a first measurement on the distance via time-of-flight sensing;
  performing, by an ultrasound sensor, a second measurement on the distance via ultrasound sensing;
  determining, by a processor, at least one of the first measurement or the second measurement is determinate;
  determining, by a processor, the distance based on the at least one of the first measurement or the second measurement that is determinate;
 determining a speed of the mobile platform via stereopsis; and
 automatically adjusting the speed of the mobile platform to avoid the obstacle according the determined distance and the determined speed, a controlling method for controlling a movement of the mobile platform depending on which one or both of the time-of-flight sensor and the ultrasound sensor are used for measuring the distance.

30. A non-transitory readable medium with instructions stored thereon that, when executed by a processor, perform the steps comprising:
 determining a distance between a mobile platform and an obstacle via time-of-flight sensing or ultrasound sensing, including:
  performing, by a time-of-flight sensor, a first measurement on the distance via time-of-flight sensing;
  performing, by an ultrasound sensor, a second measurement on the distance via ultrasound sensing;
  determining, by a processor, at least one of the first measurement or the second measurement is determinate;
  determining, by a processor, the distance based on the at least one of the first measurement or the second measurement that is determinate;
 determining a speed of the mobile platform; and
 controlling a movement of the mobile platform according to the determined distance and the determined speed, a controlling method for controlling the movement of the mobile platform depending on which one or both of the time-of-flight sensor and the ultrasound sensor are used for measuring the distance.

* * * * *